United States Patent Office 3,558,496
Patented Jan. 26, 1971

3,558,496
THICKENED LIQUID BLEACH AND PROCESS FOR PREPARING SAME
Barney Joseph Zmoda, 999 Carteret Road, Somerville, N.J. 08876
No Drawing. Filed Nov. 13, 1967, Ser. No. 682,640
Int. Cl. C11d 7/54
U.S. Cl. 252—95                     5 Claims

ABSTRACT OF THE DISCLOSURE

A bleach solution comprising an inorganic bleach solution such as sodium hypochlorite thickened with a mixture of a clay capable of being positively charged and a clay capable of being negatively charged.

---

The present invention relates to thickened liquid bleach. More particularly, this invention relates to inorganic solutions which have been thickened with a mixture comprising the combination of two clays, one being positively charged and the other negatively charged.

For many uses it would be desirable to have a bleaching composition which may be applied to surfaces and which will remain in contact with those surfaces for extended periods of time. It is also desirable to have a bleach composition which may be used on vertical surfaces and which will remain in contact with those surfaces for a sufficient amount of time to perform the function of the bleach. If the bleach composition could be thickened sufficiently, the bleach composition could be retained on surfaces for long periods of time.

In the past, attempts have been made to prepare thickened compositions containing hypochlorite bleach. Thickeners which have been tried include organic polymeric substances such as the polycarboxylic vinyl "Carbopol" and the ethylene-maleic anhydride copolymers. Inorganic thickeners have also been tried such as sodium and potassium silicate as well as clays such as Veegum, Attagel, and Microcel. Unfortunately the performance of these thickened compositions has not been satisfactory.

It has now been found that a satisfactory thickened composition containing available chlorine and particularly as derived from an alkali metal hypochlorite in aqueous solution may be accomplished by the use of a combination comprising an aqueous sodium hypochlorite bleach the other of which carries a negative charge. The clays are synergistic in their action of thickening the bleach composition. The clays are utilized as sols.

Specifically the invention comprises a bleach composition comprising an aqueous sodium hypochlorite belach solution, a clay carrying a positive charge, and a clay carrying a negative charge.

The positively charged clay may be used in a range of from about 0.25% to about 10% by weight of the total composition with the range of 0.5 to 2% being a preferred amount; the negatively charged clay may also be used in the same ranges. The usual concentration of the total clay content in the sols is generally between 5 to 20% but other concentrations may be used as well. The particular solids content of the sol is usually selected to permit facility in working with the massive material since in very high concentration many of the sols are extremely stiff gels. It is also possible to employ the dry clays directly and thereby produce a sol thereof in situ.

The alkali metal hypochlorite may be used in the range of from about 2% to about 25% by weight of the total composition with a range of 3% to 10% being preferred, it being clear however that any concentration which one desires to thicken in accordance with this invention may be resorted to and as illustrative thereof one may use hypochlorite as low as a fraction of 1%.

The clay carrying a negative charge may be exemplified by clays such as a refined hectorite. Also applicable is the modified clay disclosed in U.S. Pats. No. 3,109,847 and No. 2,974,108. Information contained in these patents is incorporated by reference.

Specifically, the sodium aluminosilicate sol of Example 1 of U.S. Pat. No. 2,974,108 is utilized in Example 4 below. The sodium aluminosilicate sol utilized therein contains 9.7% solids. Chemical analysis of the resulting sol indicated that it contained 8.5% $SiO_2$, 0.74% $Al_2O_3$ and 0.47% $Na_2O$. Thus, the product is an aluminosilicate sol having the empirical formula of about:

$$NaAlO_2 \cdot 10SiO_2$$

The clay carrying a positive charge may be exemplified by materials such as a colloidal alumina which is composed of boehmite alumina fibrils. The tiny crystals are grown from solution. Baymal is a porous material with a specific surface area of 275 square meters. Acetate groups absorbed on the surface of the micro crystals constitute about 13% of the product. Also applicable is the positively charged alumina coated silica disclosed in U.S. Pat. No. 3,007,878 and the chemically modified alumina disclosed in U.S. Pat. No. 3,031,418. The information contained in these two patents is incorporated by reference.

As can be seen from the U.S. Pat. No. 3,031,418, the sol having a positive ionic charge on the particles is a chemically modified alumina monohydrate in the form of collodial anisodiametric particles having (a) a specific surface area of 50–450 m.$^2$/g. as determined by nitrogen adsorption; (b) an X-ray diffraction pattern having lines at 3.1–2 angstroms, 2.3–2.4 angstroms, 1.8–1.9 angstroms, the strongest line being in the range between 6.2 and 6.7 angstroms; (c) about 3 equivalent percent based on aluminum of a polyvalent anion that can be chemically incorporated into the alumina monohydrate crystal lattice having the foregoing X-ray diffraction pattern.

In order to illustrate more clearly the manner of carrying out the present invention and the nature of the products thereof, the following examples are presented, wherein parts are by weight unless otherwise indicated.

EXAMPLE 1

|  | Weight percent | Actives percent |
|---|---|---|
| Baymal, 10% aqueous solution | 10.0 | 1.0 |
| Macaloid, 5% aqueous solution | 10.0 | 0.5 |
| 5.25% sodium hypochlorite solution | 40.0 | 2.0 |
| Water | Balance | |
| Total | 100.0 | |

The instant composition is prepared by reshearing the sols of the Baymal and the Macaloid in the balance of water. After this is performed, the sodium hypochlorite solution is added. Sodium hydroxide is added to adjust the pH to 12 to 12.5 in order to obtain better stability of the sodium hypochlorite solution. The Baymal and the Macaloid have a synergistic action in thickening the sodium hypochlorite. The composition thus formed is thixotropic and has a low shear, yet will remain in place for extended periods when poured upon any surface. Available chlorine is 2.0 percent. After twelve weeks' aging at room temperature in an uncolored bottle, the available chlorine present was 1.8 percent.

EXAMPLE II

|  | Weight percent | Actives percent |
|---|---|---|
| Baymal, 10% aqueous solution | 5.0 | 0.5 |
| Macaloid, 5% aqueous solution | 10.0 | 0.5 |
| 5.25% sodium hypochlorite solution | 40.0 | 2.0 |
| Water | Balance | |
| Total | 100.0 | |

The materials are mixed as described in Example I.

EXAMPLE III

|  | Weight percent | Actives percent |
|---|---|---|
| Baymal, 10% aqueous solution | 20.0 | 2.0 |
| Macaloid, 10% aqueous solution | 20.0 | 2.0 |
| 5.25% sodium hypochlorite solution | 40.0 | 2.0 |
| Water | Balance | |
| Total | 100.0 | |

The materials are mixed as described in Example I.

EXAMPLE IV

|  | Weight percent | Actives percent |
|---|---|---|
| 5% negatively charged sol as set forth in U.S. Patent No. 2,974,108 in the above | 10.0 | 0.50 |
| 10% positively charged sol as set forth in U.S. Patent No. 3,031,418 in the above | 5.0 | 0.5 |
| 5.25% sodium hypochlorite solution | 40.0 | 2.0 |
| Water | Balance | |
| Total | 100.0 | |

The ingredients are compounded as in the above examples.

EXAMPLE V

Example I is repeated except that the clay components and hypochlorite are varied to give active concentrations as indicated in the following table.

EXAMPLE V

|  | Actives percent | | |
|---|---|---|---|
|  | Baymal | Macaloid | NaOCl |
| A | 0.5 | 0.25 | 0.53 |
| B | 1.0 | 0.5 | 0.53 |
| C | 2.0 | 0.25 | 0.53 |
| D | 5.0 | 0.5 | 0.53 |
| E | 0.5 | 5.0 | 0.53 |
| F | 1.0 | 1.0 | 5.0 |
| G | 2.0 | 2.0 | 6.0 |
| H | 2.0 | 0.5 | 5.0 |
| I | 2.0 | 1.0 | 10.0 |
| J | 0.7 | 0.35 | 0.53 |
| K | 0.7 | 0.35 | 2.0 |
| L | 1.0 | 0.5 | 3.2 |
| M | 1.5 | 0.75 | 3.2 |
| N | 1.5 | 0.75 | 3.7 |

The ingredients are compounded as in the above examples.

It will be apparent that many changes and modifications of the several features described herein may be made without departing from the spirit and scope of this invention. Thus, while in the aforementioned examples only specific exemplifications of illustrative clays are set forth and while only certain concentrations are depicted and further while the chlorine yielding component has been shown as sodium hypochlorite, any variations within the scope of what is shown and described herein may be obviously resorted to. In particular, it should be noted that bleaching agents other than sodium hypochlorite will function in an equivalent manner and among these mention may be made of the chlorinated organic compounds so well known for use as bleaching materials. These include trichlorocyanuric acid, dichlorocyanuric acid, the water-soluble salts thereof such as sodium, potassium, and ammonium forms, the chlorinated heterocyclic compounds such as chlorinated hydantoins, chlorinated trisodiumphosphates, etc. and the like. It is therefore apparent that the foregoing description is by way of illustration of the invention rather than by limitation thereof.

What is claimed is:

1. A bleach composition consisting essentially of an aqueous solution of an alkali metal hypochlorite thickened with a mixture of 0.25 to 10% by weight of a clay capable of being negatively charged and 0.25 to 10% by weight of a clay capable of being positively charged.

2. The bleach composition of claim 1 wherein the bleach solution is a solution of sodium hypochlorite.

3. The bleach composition of claim 1 wherein the amounts of the clays are 0.25 to 2% by weight of each.

4. The bleach composition of claim 3 wherein the bleach is sodium hypochlorite.

5. An alkali metal hypochlorite bleach solution thickened with a combination of 1% by weight of an alumina clay which is capable of being positively charged and 0.5% by weight of a hectorite clay capable of being negatively charged.

References Cited

UNITED STATES PATENTS

| 1,813,109 | 7/1931 | Banks | 424—149 |
| 3,031,418 | 4/1962 | Bugosh | 252—313 |

MAYER WEINBLATT, Primary Examiner

U.S. Cl. X.R.

252—99, 187; 424—149